United States Patent
Michot et al.

(10) Patent No.: US 9,071,829 B2
(45) Date of Patent: Jun. 30, 2015

(54) METHOD AND SYSTEM FOR FUSING DATA ARISING FROM IMAGE SENSORS AND FROM MOTION OR POSITION SENSORS

(75) Inventors: Julien Michot, Bures-sur-Yvette (FR); Adrien Bartoli, Clermont-Ferrand (FR); François Gaspard, Les Ulis (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 421 days.

(21) Appl. No.: 13/698,267

(22) PCT Filed: Apr. 19, 2011

(86) PCT No.: PCT/EP2011/056241
§ 371 (c)(1),
(2), (4) Date: Jan. 25, 2013

(87) PCT Pub. No.: WO2011/144408
PCT Pub. Date: Nov. 24, 2011

(65) Prior Publication Data
US 2013/0162785 A1    Jun. 27, 2013

(30) Foreign Application Priority Data
May 17, 2010 (FR) .................................. 10 53803

(51) Int. Cl.
*H04N 13/02* (2006.01)
*G06K 9/62* (2006.01)
*G06T 7/00* (2006.01)

(52) U.S. Cl.
CPC .......... *H04N 13/0221* (2013.01); *G06K 9/6289* (2013.01); *G06T 7/0048* (2013.01); *G06T 2207/10016* (2013.01); *G06T 2207/30244* (2013.01)

(58) Field of Classification Search
CPC ................. G06T 2207/30244; G06T 7/0048; H04N 13/0221
USPC ............ 348/50, 42, 46, 47, 94, 116; 382/106, 382/107, 154
See application file for complete search history.

(56) References Cited

U.S. PATENT DOCUMENTS 7,359,526 B2 *  4/2008  Nister ........................... 382/100

OTHER PUBLICATIONS

Alexandre Eudes, et al., "Error Propagations for Local Bundle Adjustment", 2009 IEEE Conference on Computer Vision and Pattern Recognition, Jun. 20, 2009, pp. 2411-2418, IEEE, Piscataway, NJ, USA, XP031607351.

(Continued)

*Primary Examiner* — Jefferey Harold
*Assistant Examiner* — Jean W Desir
(74) *Attorney, Agent, or Firm* — Baker & Hostetler LLP (57) ABSTRACT

A method and a system are provided integrating inter-pose constraints, which are weighted in a step of "bundle adjustment" in a localization application (SLAM). The inertial data associated with a motion model serve to predict the pose of the system at the instant of a new image. This prediction is then used to construct an inter-pose constraint. A technique arising from learning theory selects the weighting coefficient (ratio of the noise of the covariance signals) in an efficient manner. The inter-pose constraint thus weighted is then integrated within the cost function of the bundle adjustment.

8 Claims, 4 Drawing Sheets

(56) References Cited

OTHER PUBLICATIONS

Michela Farenzena, et al., "Efficient Camera Smoothing in Sequential Structure-from-Motion Using Approximate Cross-Validation", 2008 Computer Vision A ECCV [Lecture Notes in Computer Science], Oct. 12, 2008, pp. 196-209, Springer, Berlin, Heidelberg, Berlin, XP019109256.

E. Mouragnon, et al., "Generic and Real-Time Structure from Motion Using Local Bundle Adjustment", Image and Vision Computing, Jul. 2, 2009, pp. 1178-1193, vol. 27, No. 8, Elsevier, Guildford, GB, XP026157408.

* cited by examiner

METHOD AND SYSTEM FOR FUSING DATA ARISING FROM IMAGE SENSORS AND FROM MOTION OR POSITION SENSORS

CROSS-REFERENCE TO RELATED APPLICATIONS

This application is a National Stage of International patent application PCT/EP2011/056241, filed on Apr. 19, 2011, which claims priority to foreign French patent application No. FR 1053803, filed on May 17, 2010, the disclosures of which are incorporated by reference in their entirety.

FIELD OF THE INVENTION

The subject of the present invention concerns a system and a method allowing the fusion of data arising from image sensors and from motion or position sensors for a robust, that is to say, not very sensitive to external perturbations (sudden movements, lighting etc.) and accurate localization of a visual system, of a camera, etc.

It applies, for example, to the localization and modeling in 3 dimensions or 3D of an environment. It also allows the calculation in real time of a trajectory in 3D, and can therefore be utilized to implement techniques of "augmented reality".

The invention is applicable for systems including a camera, wearable or not, (HD cameras in the movies, for example) and a motion sensor (inertial) or any other position sensor (GPS for Global Positioning System, odometers, etc.).

In a more general manner, it is applicable for computer vision techniques, the domain of augmented reality, 3D reconstruction and modeling, robotics, etc.

BACKGROUND

Definitions

The word pose integrates the notion of position and orientation of a camera or of a device comprising a camera and a motion-measuring module. The cost function notion in the domain of bundle adjustment is defined according to the prior art as being associated with the optimization algorithm that calculates the projection error (minimization in the meaning of the least squares of the distance between the 2D observations (measurements on the images) and the theoretical reprojections).

The expression "optimizing poses" means an optimization of the position and orientation of a camera or of a device.

The word scene designates a set of primitives notably characterized by their positions in 3 dimensions (for example 3D points, 3D segments etc.). These elements or primitives form the reconstruction of the real environment filmed by the camera or cameras. In summary, the word "scene" corresponds to a reconstructed environment.

The term "device" will be used in the description to designate the assembly formed by a camera incorporating a motion-measuring module or an image sensor and a motion or position sensor.

The word "system" designates the assembly that comprises, in addition to the device defined above, means of processing information or data, together with communication means.

The system calculates the pose of the device (which is in motion). We do not calculate the pose of the system, since if the processing unit is not on the same support as the device, then the poses are different. In fact, in the method according to the invention, we determine the poses of the moving elements of the system.

Each sensor observes the world (the scene) and gives a measurement of its own displacement (and not that of the device). Therefore, in order to obtain the motion of the device, one applies a simple change of coordinate system, known to a person skilled in the art (also modeled in the function Hk defined later in the description).

The problem posed in the present invention is notably to resolve the problem of fusing image and inertial data with the aim of determining a trajectory of an object or of reconstructing an environment in 3D, without any a priori on the uncertainties associated with the various sensors, or in a more general manner, of localizing a device.

In fact, it is not always possible to obtain the characteristics of the noise (image, inertial, GPS) that comes to blur the images or the information delivered by the noise sensors, which can, moreover, vary over time.

The majority of localization techniques that integrate vision and inertial data are based on an optimization method using the extended Kalman filter, or even using a particle filter known to a person skilled in the art.

These methods estimate the pose of a system by means of the vision algorithms, and then fuse this "vision" measurement through an extended Kalman filter. In order to fuse these heterogeneous data, it is necessary for the methods to introduce a noise covariance factor over the different measurements. This term, very important, is often difficult to estimate and is generally fixed a priori. The accuracy of the localization is highly dependent on this parameter.

Another problem with the optimization by Kalman is its ineffectiveness in managing a significant mass of scene data. These techniques optimize two main elements, which are the state of the system and the map of the environment (the scene). The system status depends on the motion model chosen to model the system dynamics. One generally finds therein the system pose (the word pose integrating the notions of position and orientation), expressed in a general coordinate system, together with, where applicable, speeds, and even accelerations. The map of the environment is composed of localized elements, for example, the points of the filmed scene.

In real time conditions, the methods of localizing and modeling the environment in real time, better known by the Anglo-Saxon abbreviation "SLAM" (Simultaneous Localization and Mapping), based on Kalman should limit the number of elements of the map (to a few tens). The effect of this reduction is that it significantly diminishes the accuracy of the final localization.

Furthermore, it has been shown in the prior art that the extended Kalman filter is an approximation of the Gauss-Newton optimization (first iteration).

In conclusion, in spite of the advantages offered by these methods, they nevertheless present the following disadvantages.

Localization by vision alone is not highly robust (problem of rapid movements, critical movements like pure rotations, temporary occulting of the camera etc.). Moreover, the camera can become decalibrated (shocks, temperature changes etc.).

Localization by integration of the inertial data does not enable accurate localization in the medium and long terms; problems of drift, sensor bias, noise etc. It is therefore necessary to use a plurality of sensors to localize a system in an accurate manner.

Definitions t=given instant or time index,
w: index of any sensor, either a camera and hence w=c, or a motion sensor
w=k, k being the phonetic index of a camera,
c: index designating a camera sensor (or the index of the image sensor when there are several sensors), $x_t$: vector containing the estimation of the scene (or a part thereof) and of the camera poses (or a part thereof) at the instant t,
$z_t^w$: vector of observations associated with a measurement made by the sensor w at the instant t,
s: the scene (the reconstructed environment),
p: a pose of a camera, this one contains the position T and the orientation R.

SUMMARY OF THE INVENTION

The system and the method according to the invention are based on a new approach, which implements an automatic weighting between the motion and/or position data with the data associated with the images through bundle adjustment.

The invention relates to a method for fusing data arising from a first image sensor and a motion and/or position measuring module, the said first sensor and the said motion and/or position measuring module being integral and forming a device, the method being executed by a processing module in order to localize the said device, characterized in that it comprises at least the following steps:
  A first step consisting of acquiring several points on the images in order to define a pose $p_t^c$ of the device (image camera and motion and/or position measuring module) for a given instant t,
  A prediction step of the pose $\hat{p}_t^k$ of the device (camera and motion/position sensor) for the same given instant t and using the measurements from the motion and/or position measuring module,
  A step where we determine an associated constraint $\epsilon_k$ for the device (camera and sensor) k,
  A step where we automatically determine a weighting coefficient $\lambda_t$ of the said constraint,
  An estimation step of the current pose $p_t$ of the said device,
  A step of simultaneous optimization by the bundle adjustment technique using the following cost function:

$$E_{BA}(X_t, Z_t) = \sum_{t'=t-(N-1)}^{t} \varepsilon_c^2([p_{t'}s], z_{t'}^c) + \sum_{t'=t-(N-1)}^{t} E_p([p_{t'}s], Z_t)$$

with $$E_p(x_t,Z_t)=\epsilon_c^2(x_t,z_t^c)+\lambda_t^2\epsilon_k^2(x_t,z_t^k)$$

$\epsilon_c^2$: reprojection errors of the scene in the images
$x_t$: =[ps] the pose of the device and the scene
$z_t^c$: =the observations of the scene detected in the image of the camera c at the instant t
$Z_t=[z_t^c z_t^k]$ combination of all the measurements for all the camera c sensors and of the sensors k of motion and/or position module at an instant t The method comprises, for example, a step for initializing the databases of the key poses and of the scene elements (3D) by reconstructing the environment of the image sensor using a given number of first poses and executing a triangulation of the 3D primitives from the elements of interest that constitute them for the chosen poses.

According to one embodiment, the step of automatic selection of the weighting coefficient uses the result of a refinement step of the pose of the device, starting from a first estimation of the pose of the device delivered by the module for estimating the pose by vision and taking account of the previously estimated scene elements, and by adding to the cost term the prediction error (constraint) delivered by the automatic selection module of the weighting and weighted by a factor lambda $\lambda$ or $\lambda_t$ learned in the automatic selection module of weighting; at the end of the refinement step, the current pose of the system is added to the database (historical) of the poses.

The step of automatic selection of the weighting comprise, for example, a refinement step of the pose of the device; in the refinement module, the cost function is composed only of reprojection errors of the 3D primitives of the scene on the camera, whose pose is currently refined, followed by a construction step of the constraint, then by the step of automatic selection of the weighting; at the end of the refinement step, the current pose of the system is added to the database (historical) of the poses.

The method can also comprise a step of selection of the key images including the following steps: select a first image I1 as a key image, then a second image I2 chosen as distant as possible from I1 in the video and possessing at least M points of correspondence of interest with I1, then select a third image I3, the most distant from I2 such that there are at least M points of interest correspondent between I3 and I2 and at least M' points of interest correspondent between I3 and I1, and so on for the following images In; proceed in the same way, verifying that the images In−2, In−1 and In possess at least M points of interest corresponding to the same 3D primitive.

The value of the constraint is chosen, for example, from the following list of constraints:
Position constraint $$\varepsilon_k^t(x_t, z_t^k) = \frac{1}{\sqrt{3}} \|\hat{T}_t^k - T_t\|$$

Orientation constraint:

$$\varepsilon_k^R(x_t, z_t^k) = \frac{1}{\sqrt{9}} \|\hat{R}_t^k R_t^T - I_3\|$$

with R as the rotation matrix parametrizing the orientation, I the Identity matrix . . .
Scale factor constraint (or that of the translational standard)

$$\epsilon_k^t(x_t,z_t^k)= \left\| \|\hat{T}_t^k-T_{t-1}\|-\|T_t-T_{t-1}\| \right\|.$$

In order to predict the pose $\hat{p}_t^k$ of the device, the method can use the inverse observation model $H_t^{-1}$, which provides an estimation of the state $x_{t'}^k$ of the device at an instant t'≤t corresponding to the last measurement $z_{t'}^k$ of the sensor k:

$$\hat{p}_t^k=F_t(H_{t'}^{-1}(z_t^k-n_t^k))+w_t$$

this model estimates a pose $\hat{p}_t^k$ of the device at the instant t corresponding to the image time $I_t$, from the measurement $z_t^k$ obtained by the motion/position sensor and from the preceding state $x_{t-1}$.

The invention also relates to a system for fusing data arising from a first image sensor and from a motion and/or position measuring module, the said first sensor and the said motion and/or position measuring module being integral and forming a device, the said system including: a processing unit suitable for executing the steps of the abovementioned method.

BRIEF DESCRIPTION OF THE DRAWINGS

Other characteristics and advantages of the present invention will emerge more clearly on reading the description that follows of one or more embodiment examples given as an illustration, and not at all restrictive, annexed by the figures, which show.

DETAILED DESCRIPTION

In order to provide a better understanding of the principle and the modules implemented in the invention, the example that follows is given as an illustration, and not at all restrictive, of a system comprising an image camera and a motion and/or position sensor connected to a processing unit suitable for executing the steps of the different embodiments of the method. In certain cases, it will be possible to use a camera equipped with a module allowing its motion to be measured.

In summary, the method according to the invention will incorporate inter-pose constraints (that is to say, a constraint on the pose measured by the vision linked with the trajectory measuring device), which are weighted in a step of "bundle adjustment" in a localization application (SLAM). The inertial data associated with a motion model serve to predict the pose of the system at the instant of a new image. This prediction is then used to construct an inter-pose constraint. A technique arising from learning theory selects the weighting coefficient (ratio of the noise of the covariance signals) in an efficient manner, that is to say automatic and suited to the context, directly in the bundle adjustment in real time. The inter-pose constraint thus weighted is then integrated within the cost function of the bundle adjustment. Extended bundle adjustment is more accurate than the algorithms of the Kalman type, since it performs in particular several Gauss-Newton iterations.

Figure 1:
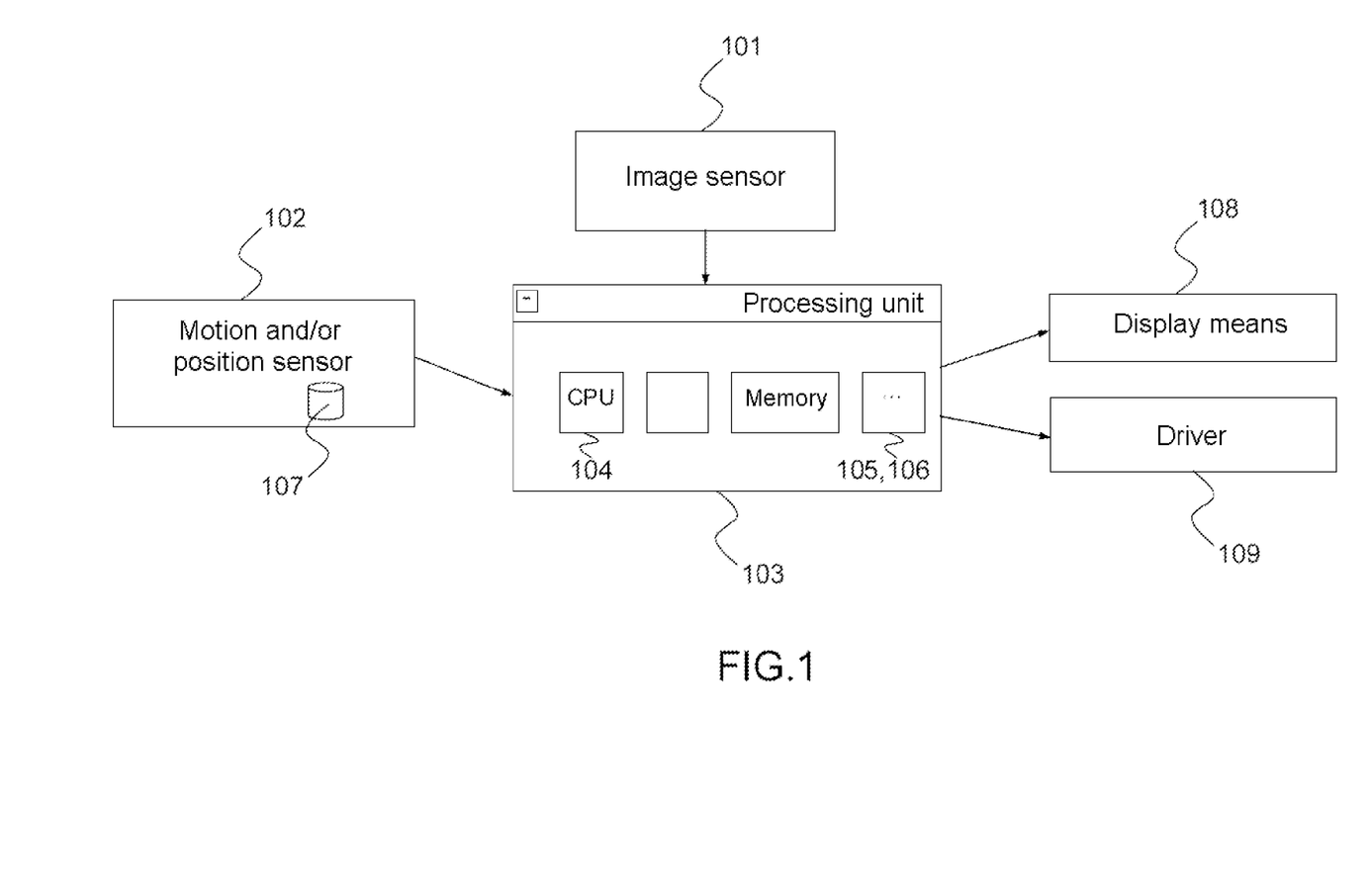
FIG. 1, an example of a system architecture in which the method according to the invention can be executed, FIG. 2, an illustration of the observations Oi and the reprojections RPi, FIG. 3, a first example of a synoptic of the method according to the invention, and FIG. 4, a second synoptic of the utilization of the method according to the invention.

FIG. 1 illustrates an example of a diagram of a system architecture in which the method can be implemented.

The system according to the invention 100 comprises:
- an image sensor 101, such as a pinhole camera, omnidirectional, 3D-TOF camera, stereo camera, webcam, infrared,
- a motion or position sensor 102, such as a GPS, an odometer; the image sensor 101 and the motion sensor can be on the same support; the motion or position sensor 102 can also incorporate a buffer memory 107 memorizing the data that it generates or that it measures,
- a processing unit 103 which can be on the same support or delocalized. In the case where this processing unit is distant from the image and position sensors, it exchanges information or data through physical means of communication (wirelines, Internet) or by radio or wireless means,
- the processing unit 103 is composed, for example, of a processor 104 suitable for executing the steps of the method according to the invention, of the means of storing data, for example, a database 105 of the poses of the system, a database 106 of the 3D primitives of the scene and of the relations linking the 3D primitives and their observations in the images. In the case where the motion sensor does not incorporate a buffer memory for memorizing the data produced by the motion sensor, this memory will be inserted at the processing unit 103.
- A means of visualization 108 by an operator, such as a LCD screen or a PC monitor, a module 109 for controlling a driver (motor etc.) with the aim, for example, of making a robot navigate autonomously (the robot is moved thanks to the method according to the invention, for example, by controlling the robot's motors).

Each sensor observes the world (the scene) and gives a measurement of its own displacement (and not that of the device). Therefore, in order to obtain the motion of the device in the case of a device composed of a camera sensor and a motion sensor, one applies a simple change of coordinate system, known to a person skilled in the art (also modeled in the function H described later).

In the case of a camera incorporating a processing device, the processing unit 103 will be integrated with the camera.

Before describing the different steps implemented by the method according to the invention, some useful reminders are given for understanding the method according to the invention.

Reminders

The problem of fusion of the sensors can be formulated as an inverse problem, discretized in the time domain. The observation process is defined for a sensor w by the expression of the following observation vector:

$$z_t^w = H_t^w(x_t) + n_t^w$$

Where $H_t^w$ is a projection function executed by the sensor w at a given instant t. This function associates a real object or an information $x_t$ (here the localization of the system and the scene) with an observation vector $z_t^w$. The function $H_t^w$ comprises the change of coordinate system, which allows observations expressed in the coordinate system specific to the sensor concerned to pass to the coordinate system of the system according to the invention.

This can be estimated by a calibration process known to a person skilled in the art.

The error vector $n_t^w$ is usually represented by a vector of Gaussian functions characterized by a mean of zero (white noise).

The error vector $n_t^w$ models the inaccuracy introduced during the measurement phases.

The objective of the inverse problem is to retrieve the real unknown vector $x_t$ from multiple observations delivered by the sensors.

For a dynamic system, a motion model defining the behavior over time of the device must be used. The model used will be $$x_t = F_t(x_{t-1}) + w_t \text{ real unknown vector}$$

where $F_t$ defines the new state $w_t$ of the device (notably including the pose) from its preceding state.

The static systems, such as the scene s for example, are by definition constant over time and can therefore be expressed without the time index t.

Recursive Bayesian Estimation

Statistical filtering consists of estimating the state of a dynamic system, which best validates the uncertain and a priori measurements, knowing that the measurements can be noisy. In this method, one considers that the state of the system (all the measurements from the sensors) is a vector of random variable for which a probability density function (pdf) is sought.

The objective of a recursive Bayesian estimator is to find this pdf, minimizing the hoped-for value by a cost function. The best-known cost function is the mean square error or MSE function for which one seeks to minimize the square error between an estimator and its observations.

The mean square error for a sensor of index k is defined as $$\varepsilon_k^2(x_t, z_t^k) = \frac{1}{n_t^k} \Delta_t^{kT} (\Sigma_t^k)^{-1} \Delta_t^k$$

where $\Delta_t^k$ is the vector of residual measurement and $n_t^k$ is its length, such that $$\Delta_t^k = z_t^k - H_t^k(x_t).$$

When all of the measurements are considered to be mutually independent of the covariance $\Sigma_t^k = \sigma_t^k I$, with $I_s$ as the identity matrix we then obtain $$\varepsilon_k^2(x_t, z_t^k) = \frac{1}{n_t^k} \frac{1}{(\sigma_t^k)^2} \|z_t^k - H_t^k(x_t)\|^2.$$

The problem of sensor fusion consists of minimizing all the mean square errors of the sensors. An example of the Bayesian estimator is the bundle adjustment.

Bundle Adjustment Technique

The bundle adjustment technique or BA for Bundle Adjustment is an optimization technique based on a method of resolving non-linear least squares (for example, Gauss-Newton, Levenberg-Marquardt etc.) The objective E function to be minimized is usually a cost term based on the image (with the unit being the pixel), and one uses, for example, the Mean Square Error MSE: the reprojection error $E(x_t, z_t^c) = \varepsilon_c^2(x_t, z_t^c)$, which is the sum of the distances squared between the observations 2D, $z_t^c$ of the camera c at the image t and the reprojections of the scene in the image.

$\varepsilon_c^2$: previously defined error
$x_t$: =[ps] the pose of the device and the scene
$z_t^c$: =the observations of the scene detected in the image at the instant t by the camera c.

The bundle adjustment technique is used for different applications depending on the input variables to be optimized. Usually, the variables can be the last pose $p_t$ only, and we talk about "pose refinement", of the scene s alone or of a certain number of poses and of the scene, and we will then talk about local or general bundle adjustment (if we are refining all of the poses) $[p_t \, s]$.

For example, in order to refine the scene and the pose of the device, we resolve the equation:

$$x_t^* = \underset{x_t}{\operatorname{argmin}} E(x_t, z_t^c),$$

the superscript c signifies that these are observations made by the camera. The superscript * indicates an optimization. This equation can be resolved by a technique of the prior art such as Gauss-Newton or Levenberg-Marquardt.

Reprojection Error

The reprojection error for observations made by a camera k is defined here:

$$\varepsilon_c^2(x_t, z_t^c) = \frac{1}{n_t^c} \frac{1}{(\sigma_t^c)^2} \|z_t^c - \Psi(x_t, s')\|$$

with $\Psi(x_t, s')$ as the projection function of a set of 3D s' primitives of the scene in the image operated by the camera c whose pose $p_t$ is contained in $x_t$. This function is specific to the type of camera and to the type of 3D primitives used in the system.

One can, for example, take a camera of the pinhole type and primitives formed by 3D points.

Figure 2:
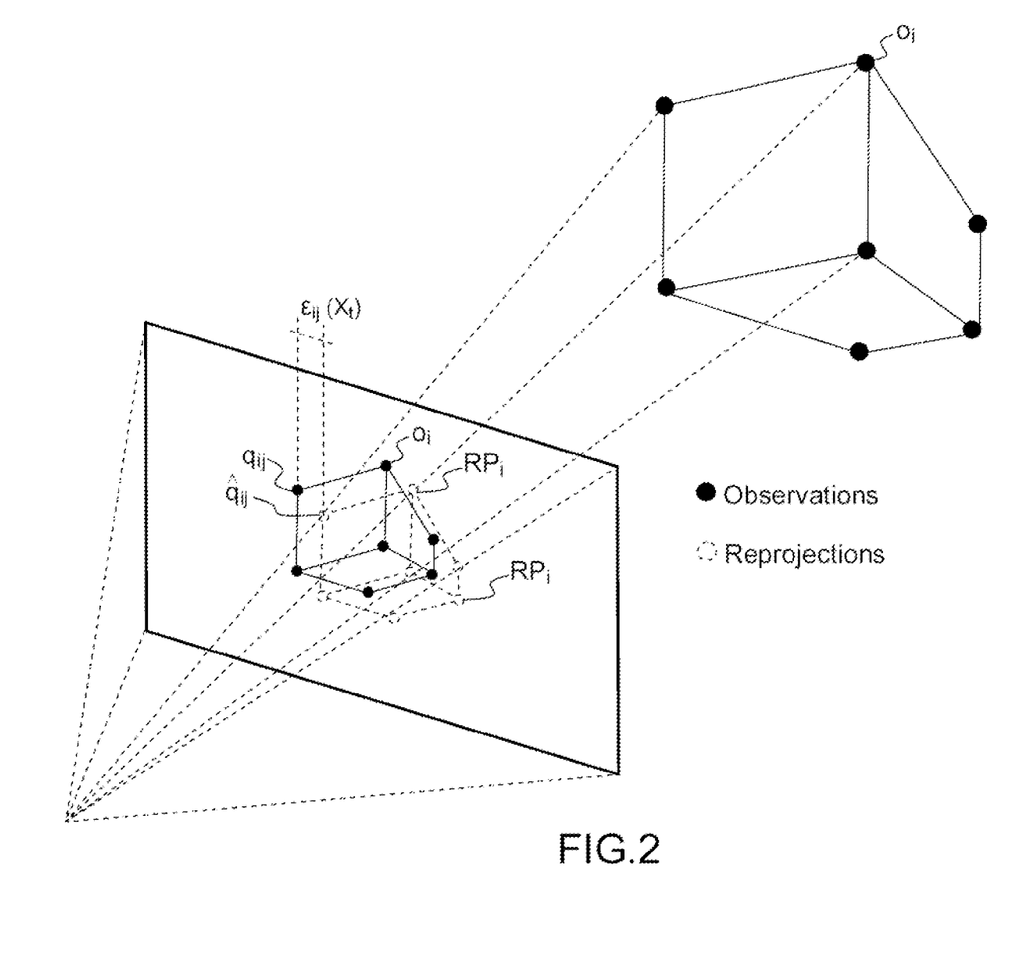

FIG. 2 illustrates a projection from a 3D point $$\varepsilon_c^2(x_t, z_t^c) = \frac{1}{n_{ij}^c} \frac{1}{(\sigma_{ij}^c)^2} \sum \varepsilon_{ij}(x_t)$$

$\sigma_{ij}^c$ the standard deviation of the observation $z_{ij}$ if this is known (otherwise $\sigma_{ij}^c = 1$).

and $\{z_t^c = \hat{q}_{ij}\}$ the observations of the camera c at the instant t. Other types exist in the domain and are known to a person skilled in the art.

Modules for the System Architecture

Figure 3:
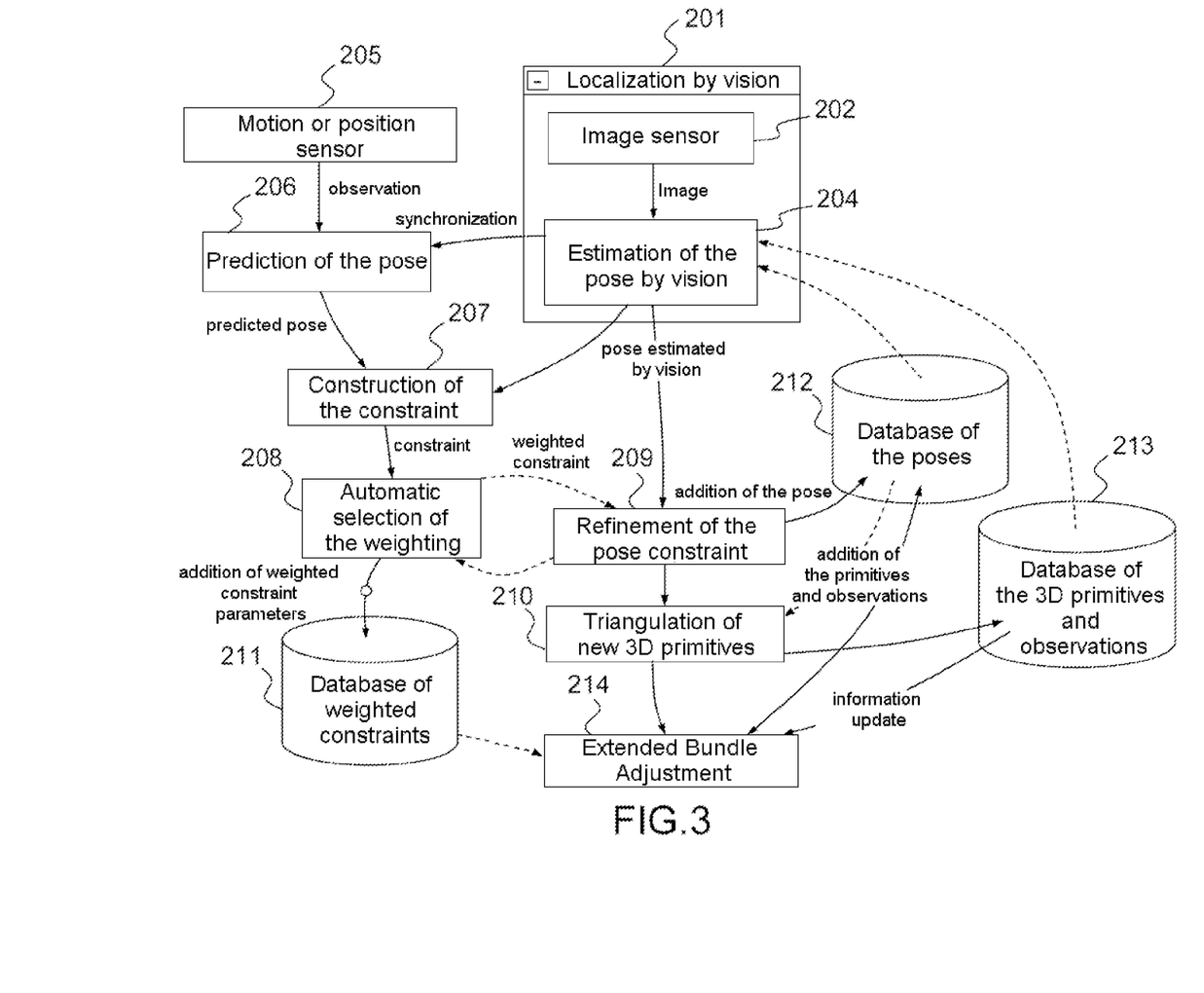
Figure 4:
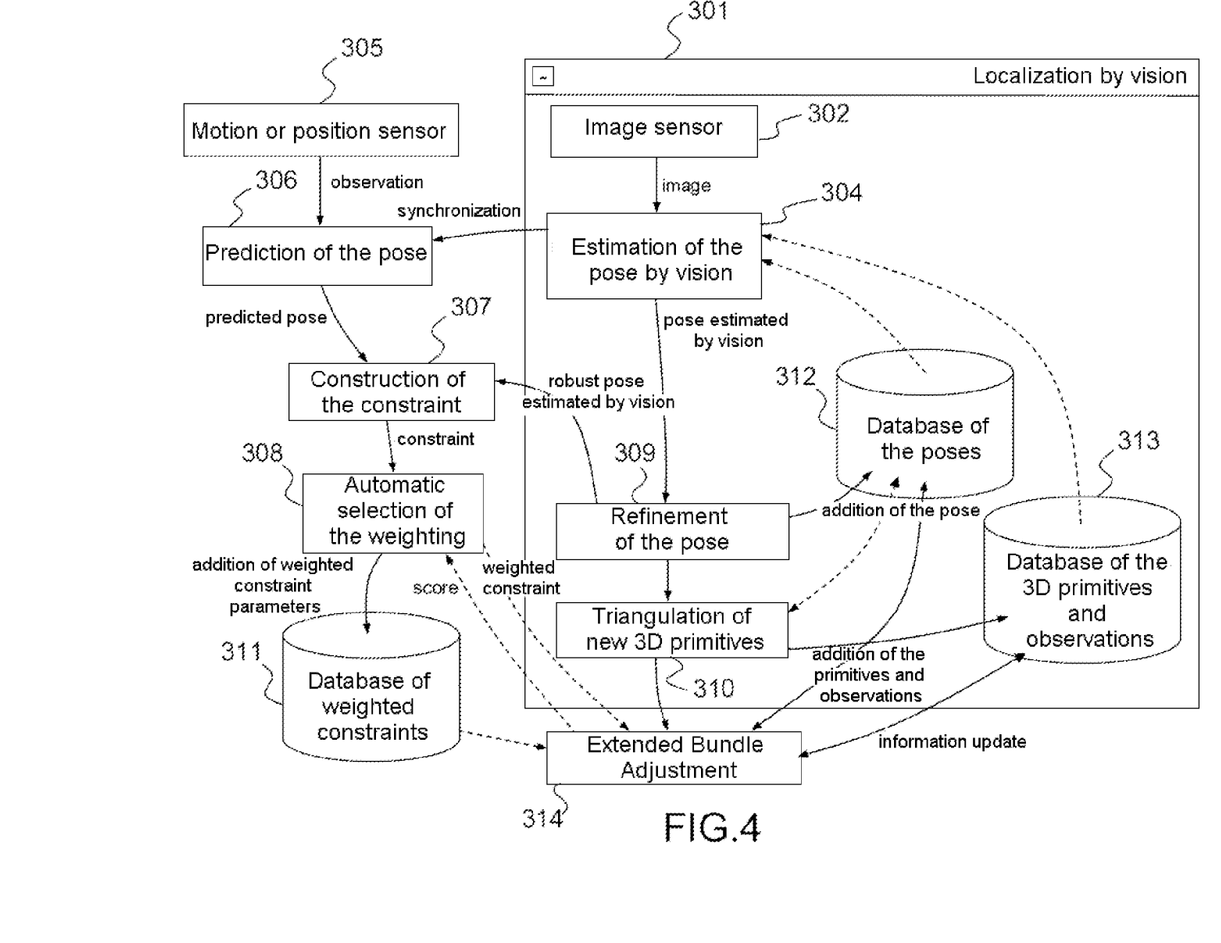

FIGS. 3 and 4 describe two examples of a variant embodiment of the method according to the invention. The modules and their functionalities implemented in these two variants will be described.

Localization by Vision Part

[201,301] Module of Localization by Vision Situated at the Data Processing Device Techniques of the state of the art are used in this module to estimate the pose of the system based on the camera's images. This module can contain various state of the art algorithms and can therefore vary according to the implementations.

What is important for the method according to the invention is to have at the output of the vision part:
 an estimation of the pose of the system
 a history of the last poses of the system (or a part thereof)
 a history of the 3D primitives of the scene and their observations in the images (or a part thereof).

[202,302] Acquisition of the Images

We consider a module for acquiring images coming from a camera in a synchronous or asynchronous manner.

[204,304] Estimation of the Pose by Vision

We estimate the pose (position and orientation) of the device by means of the images defined above in the case where the sensors are not on the same support as the processing unit.

The estimation of the pose is performed by the following methods

Detection of 2D Elements of Interest

When an image arrives at the module [204,304], the method executes a detection of elements of interest. An element of interest is an observation of a 3D primitive, which has a well-defined position in an image and which corresponds to a spatial point, detectable in a robust manner at the change of point of sight or lighting. Numerous detectors are known to a person skilled in the art.

Description of the Elements of Interest

The character of the elements of interest is then defined by descriptors allowing them to be mutually differentiated and making it possible to find them in the subsequent images. A descriptor allows the point to be recognized through its near environment.

Numerous descriptors (ZNCC, Anglo-Saxon abbreviation for Zero Mean Normalized Cross Correlation, etc.) are known to a person skilled in the art.

Cross Correlation of Elements of Interest

Let us now consider that we have two images of the same scene taken from different points of sight. For each of these, we assume that we have detected elements of interest and have calculated the corresponding descriptors.

The actual correlation phase consists of establishing a correspondence between elements of interest having similar characteristics between the two images.

Several correlation methods are known to a person skilled in the art.

Calculation of the Pose Based on the Correspondences

A pose of the device is defined by the position $T_t$ in 3 dimensions (x, y, z) in a general coordinate system, together with the orientation of the device, stored for example in the form of a matrix having a rotation $R_t$. The method can vary, for example, one can take the 5 points algorithm or the 8 points algorithm (classic methods in computer vision), and calculate the pose of the device from N images. One can also calculate the pose of the device by using the previously reconstructed scene (resection algorithm known to a person skilled in the art). The parameters describing the pose can also vary (a quaternion in place of a rotation matrix, etc.).

Robust Estimation of the Pose

The first estimation of the pose can be perturbed by errors due to the preceding methods, and we propose here to estimate the pose of the device in a more accurate and robust manner. To do this, a person skilled in the art uses known methods: RANSAC, M-Estimator, etc.

Selection of the Key Poses

The movement between two consecutive images must be sufficiently great to calculate the epipolar geometry in an accurate manner, and hence to estimate the pose of the two images. The method therefore selects images relatively distant from each other, but having sufficient numbers of common points. To achieve this, the first image I1 is always selected as a key image. The second image selected, I2, is chosen as distant as possible from the image I1 in the video, but it is an image that must have at least M points of correspondence of interest with I1. Then, for I3, we choose the image the most distant from I2, such that there are at least M points of interest correspondent between I3 and I2 and at least M' points of interest correspondent between I3 and I1. This way, there are enough common points of interest among the images to determine the movement of the camera. For the following images In, one proceeds in the same way, verifying that the images In−2, In−1 and In have at least M points of interest correspondent with the same 3D primitive. An image I only becomes a key image In if it obeys these rules. This method of detecting the key images can vary, and we propose an example here.

Initialization of the Scene

The initialization of the scene is only performed once at the start of the sequence. Here it is a question of reconstructing the environment one first time. To achieve this, one can, for example, use the first three key poses and triangulate the 3D primitives from the observations thereof (elements of interest) in the three images (3D triangulation method). The method allows notably the databases of the key poses and the scene elements (3D) to be constructed.

[212,312] Database of the Key Poses

We consider that we possess a database containing the last N (from 2 to all) poses of the system (with the current camera calibration parameters).

[213,313] Database of the Scene Elements

We consider that we possess a database of the 3D primitives of the reconstructed scene, together with their correspondences (associations of 2D observations (x, y)—3D primitive) in each key image, in which correspondences the element (whose pose (position and orientation) is known through the database [212]) will have been detected. The 3D primitives are, for example, 3D points (x,y,z), but can be other elements (patch, segment, etc.).

[209,309] Extended Pose Refinement

The "pose refinement" and "extended pose refinement" modules are based on an algorithm very well known in the domain of computer vision: bundle adjustment. More precisely, in this part, the method refines only the current pose of the device, starting from a first estimation of the pose delivered by the module [204,304], and taking account of the previously estimated scene elements.

In the module [309], the cost function is composed only of the reprojection errors of the 3D primitives of the scene on the camera whose pose is currently refined. In the module [209], we add to the cost term the prediction error (constraint) delivered by the module [208] and weighted by a factor lambda $\lambda$ or $\lambda_t$ learned in the automatic weighting selection module [208,308].

At the end of the refinement, the current pose of the system is added to the database (historical) of the poses [212,312].

Pose refinement can be performed in the detailed manner described below.

In an SfM incremental tracking method, a refinement is executed on the camera localization when a new image or a key image is detected.

It is thus possible to retrieve the current pose $p_t$ of the device, which explains the measurements from sensors $Z_t = [z_t^c z_t^k]$ (complete set of measurements for all the camera sensors c and the motion sensors k at an instant t). The costs aggregation function is then constructed with the visual standard error term $\epsilon_c^2$, together with the selected constraint $\epsilon_k^2$ on the basis of the pose prediction provided by the sensor k or of the camera when the latter incorporates an integral motion-measuring module. The second term is weighted with a previously selected weighting factor $\lambda_t$ that will be detailed later in the description.

The general term MSE (mean square error) is then given by the formula $$E_p(x_t, Z_t) = \epsilon_c^2(x_t, z_t^c) + \lambda_t^2 \epsilon_k^2(x_t, z_t^k) \text{ for a motion or position sensor } k, \text{a camera } c, \text{an instant } t.$$

The current pose $p_t$ is then optimized using the Levenberg-Marquardt algorithm with the cost function $E_p(x_t, Z_t)$ in order to resolve $$p_t^* = \underset{p_t}{\operatorname{argmin}} E_p(x_t, Z_t)$$

The "*" means that we obtain the best value of $p_t$.

[210,310] Reconstruction of 3D Primitives

This module for reconstructing 3D primitives is activated after refining the pose ([209,309]), either immediately after or some time later. It consists of triangulating the 3D primitives of the scene (3D point, for example) from the 2D observations thereof made in the last N images (e.g. N=3). To do this, we utilize the state of the art algorithms of computer vision.

On completion of the calculations, the 3D primitives and their correspondences (associations of 2D observations—3D primitive) are added to the 2D/3D database.

Estimation Part of the Pose by Integration of the Data from a Position/Motion Sensor.

[205,305] Acquisition of the Data from the Position/Motion Sensor

We consider a system (sensor and processing module to driver link) allowing the data from the motion and/or position sensor to be retrieved in an asynchronous manner. When an item of data is produced by the motion sensor, this item of data is retrieved by a program to be stored in a buffer memory, located either at the motion and/or position sensor or at the processing module.

[206,306] Pose Prediction Based on the Inertial Sensor

When a request is addressed to the prediction module (206, 306) (by the module for estimating the pose by vision [204, 304]), the prediction module retrieves the sensor's observations prior to the instant required by the synchronization, removes them from the battery or buffer memory, and then calculates the pose (or a part thereof) of the device or of the system from these measurements and from a motion model (optional, but the method is more accurate with it). If we consider that the device (composed of the camera and of the motion sensor) is separate from the processing means, a PC for example, the method then calculates the pose of the device and not that of the system incorporating the PC.

Prediction Model Hypothesis

Since the bundle adjustment technique does not supply optimized speeds, these amounts must be estimated upstream, or be supplied directly by the second motion and/or position sensor. The presence of the inverse observation model $H_t^{-1}$, is also assumed, which provides an estimation of the state of the device $x_{t'}^k$ at an instant t'≤t, corresponding to the last measurement $z_{t'}^k$ of the sensor k. Thus, with the device's motion prediction model, the predicted pose at the time or instant t is the following:

$$\hat{p}_t^k = F_t(H_t^{-1}(z_t^k - n_t^k)) + w_t$$

This model estimates a pose $\hat{p}_t^k$ of the device (camera and motion and/or position sensor, for example) at the instant t corresponding to the time of the image $I_t$, from the measurement $z_t^k$ obtained by the motion/position sensor and from the preceding state $x_{t-1}$. The error vectors $n_t^k$ and $w_t$ are thus assumed to be zero.

[207,307] Constraints Definition Module

This module defines the type of constraint (or error types) that we will add to the refinements cost function.

In the first version of the system (FIG. 3), the method changes the cost functions of the modules [209] and [214], whereas in the second version of implementation of the method illustrated in FIG. 4, this term is only added to the cost function of the pose adjustment [314].

This term (cost function) is usually a distance between the current pose (or a part thereof) of the system or of the device (and which we optimize) and the pose predicted by the module [206,306]. The choice of error is to be specified by the designer and depends on the type of observations the motion or position sensor delivers. For example, if one is using a 3D gyroscope, this latter delivers an information of angular speed Ω. This information, combined with a motion model (constant angular speed, for example), allows a prediction of the orientation $q^k$ to be constructed at the same instant as the key image (whose current orientation is $q^c$). The error can be the distance between the two quaternions $\|q^k - q^c\|$, for example.

The type of constraint depends on the nature of the measurements taken by the sensors. For example, several constraints can be proposed for sensors Position constraint $$\varepsilon_k^t(x_t, z_t^k) = \frac{1}{\sqrt{3}} \|\hat{T}_t^k - T_t\|$$

Orientation constraint:

$$\varepsilon_k^R(x_t, z_t^k) = \frac{1}{\sqrt{9}} \|\hat{R}_t^k R_t^T - I_3\|$$

with R as the rotation matrix parametrizing the orientation, and/as the identity matrix, etc.

Scale factor constraint (or translational standard constraint)

$$\varepsilon_k^t(x_t, z_t^k) = \left| \|\hat{T}_t^k - T_{t-1}\| - \|T_t - T_{t-1}\| \right|.$$

Each constraint will have a different impact on the localization system and will tend to correct the corresponding drift. The method according to the invention is generic, so it will be possible for the user's defined constraint to be any distance term (in least squares) that constrains the variables optimized in the bundle adjustment technique.

Automatic Selection of Weightings: Estimation of the Covariances Ratio

[210] Module for Selecting New 3D Primitives

The error or constraint defined by the constraint construction module must be weighted by a coefficient we shall call lambda λ, chosen by a specific technique, some examples of which are given below.

In the given example, several methods are proposed for calculating this weighting factor. These methods can be utilized independently of each other to resolve this problem.

To do this, a general cost function is constructed with the vision-based error term and with the fusion term (the preceding constraint) weighted by the lambda. Several optimizations are then executed, either invoking the module [209] of FIG. 3 several times, or invoking the module [314] of FIG. 4 several times for a different lambda set (for example, with a static set of 100 lambdas ranging from 0.1 to 100).

As detailed below, the criteria for the selection of the weighting parameter lambda vary. We utilize either the L-Curve method, and it is a question of determining the maximum curvature of a certain curve, or we utilize the method known as cross validation and we seek the best lambda value for which the prediction of a reprojection is most effective.

One can also utilize other methods by criteria (L-tangent Norm, Reginska, etc.) or by learning (such as a cross validation, etc.).

Once the best lambda has been chosen, we proceed to the final optimization (either [209] or [314]) with this weighting and we also store this value and the constraint parameters in the database provided for that purpose [211,311].

Two methods of determining the weighting parameter will be given as an illustration, knowing that others known to a person skilled in the art could be implemented.

Selection Method by L-Curve Criterion

The L-Curve criterion was originally used in regularization problems in which one seeks to estimate an effective regularization parameter enabling the minimization both of a first cost term and the number of parameters of a model.

The method was furthermore used in problems of optimization of non-linear least squares with several objectives, where it was a question of finding a compromise among the different objectives by estimating the weighting factor lambda of each cost term, and thereby seeking the best minimization of the set of objectives.

The L-Curve criterion therefore represents the compromise between the two cost terms in log-log scale.

This criterion usually has an L shape, with a "corner" separating the horizontal part from the vertical part, corresponding to the dominance of one of the two cost terms to be minimized (objectives). The curvature k(I) of the L-Curve criterion allows the sought-for corner to be found:

$$\kappa(\lambda) = 2 \frac{\hat{\rho}' \hat{v}'' - \hat{\rho}'' \hat{v}'}{(\hat{\rho}'^2 + \hat{v}'^2)^{\frac{3}{2}}}$$

where ' and " represent the first and second derivatives in relation to lambda. A "good" weighting parameter lambda is situated near the corner of the criterion, where the curvature k is at its maximum. Thence, one seeks:

$$\lambda^*_{LCurve} = \underset{\lambda \in [0,1]}{\mathrm{argmax}} \varkappa(\lambda)$$

In order to estimate the L-Curve, we must calculate several pairs of constraints for the camera with index c and the sensor with index k, representing the two objectives ($\epsilon_c, \epsilon_k$) to be minimized for different values of lambda. This means that for each value of lambda, we optimize either the last pose of the device [209], or the last N poses with a part of the scene [314]. We then construct the L-Curve with the pairs and we estimate the best lambda situated at the maximum curvature (k max).
Method of Selection by Learning
Cross Validation The cross validation method is a very popular tool based on statistical considerations:

an adequate model (here the weighting factor lambda) should be able correctly to predict any missing data. More precisely, if we remove a few measurements from the data set, the estimated solution (learning phase: module [209 or 314]) should be able to predict these observations (during the test phase).

Several variants of cross validation exist, which differ mainly by their management of the test and learning sets. In the present case, the limited number of camera observations incites the use of the method that recycles the observations, better known by the expression "leave one out", but one can just as well use another variant.

The cross validation score Cvloo(I) reflects the quality of the prediction for a certain weighting parameter lambda. It represents the mean difference between the real observation yj of a 3D point j and the prediction $H_t^c([p_t^{|j|} s_t^j])$, where the pose $p_t^{|j|}$ is optimized without the point j.

$$CV_{loo}(\lambda) = \frac{1}{n} \sum_{j=1}^{n} H_t^c([p_t^{|j|} s_t^j]) - y_t^j$$

with $p_t^{|j|}$ as the solution of the module [209 or 314] without the point j. The objective of cross validation is then to maximize the quality of the prediction made by the module [209 or 314] for a lambda, and thereby to minimize the prediction errors.

$$\lambda^*_{CV} = \underset{\lambda}{\mathrm{argmin}} CV_{loo}(\lambda)$$

[211,311] Databases of Weighted Constraints

Each weighted constraint is associated with a pose $p_t^c$ of the device for each image if the selection step for the key images is not implemented, or for each key image, and is then stored in a database 211, 311. This constraint (with the weighting) will be re-used each time the associated pose of the device is refined in the adjustment module [214,314]. We store the elements of the constraint in the database 211, 311: the weighting $\lambda_k$ and the prediction $\hat{p}_t^k$ of the pose of the device and not the entire constraint, for example $\lambda_k \|\hat{T}_t^k - T_t\|$, T being a part of p as is specified in the notation.

[214,314] Extended Bundle Adjustment

Bundle adjustment consists of the simultaneous optimization of a certain number of poses of the device (all or some, retrieved from the database [212,312]), together with a certain number of scene 3D primitives (stored in the database [213,313]), for example, all of the primitives seen by the poses we are optimizing.

The general cost function to be minimized is formed on the one hand, with the vision: distance between the reprojections of the scene elements in the images and their true measurements taken in the images, and on the other hand, by all the weighted constraints associated with the different key poses of the system (database [211,311]).

To resolve this optimization problem, we invoke an optimization algorithm called Levenberg-Marquardt. One can also use other algorithms (Gradient descent with or without preconditioning, Gauss-Newton, etc.), known to a person skilled in the art.

The method typically optimizes only the last three key cameras or the last three poses of the camera, although this number can vary.

Local Bundle Adjustment (LBA)

A refinement is periodically performed on the scene and the localization of the system in order to reduce the accumulated errors of the incremental SLAM. Good results are obtained by local optimization (that is to say, by refining only the last poses).

It is therefore possible to optimize, for example, at least the poses of the last two poses (possibly key poses). A simple way of proceeding is to inject the preceding constraints into the LBA cost function. We define $X_t = [p_{t-9} \ldots p_t s']$, a vector including fixed poses ($p_{t-9}, \ldots p_{t-3}$), poses of the camera we wish to refine ($p_{t-2}, p_{t-1}, p_t$) and the current estimation of a part s' of the scene s, for example, the set of 3D points seen in the last N poses.

We put down, for example, N=3, M=9

The idea is to optimize the poses, that is to say to optimize the position and the orientation of a camera and of a device.

The bundle adjustment cost function with the constraints then becomes:

$$E_{BA}(X_t, Z_t) = \sum_{t'=t-(N-1)}^{t} \varepsilon_c^2([p_{t'}s], z_{t'}^c) + \sum_{t'=t-(N-1)}^{t} E_p([p_{t'}s], Z_t)$$

The first member of the equation corresponds to the sum of the reprojections of the camera whose poses are fixed with, for example a=3, b=9, d=2.

The first part of the equation corresponds to the reprojection errors of the camera whose poses are not refined (therefore fixed).

It is not necessary to constrain all of the poses in this case, only the errors of original reprojection are taken into account.

The second part of the equation is composed of reprojection errors and constraints on the N most recent poses of the camera.

The method then optimizes the localization of the system (the last N of the camera) and a part of the scene, using the Levenberg-Marquardt algorithm to resolve $$[p_{t-2} p_{t-1} p_t s']^* = \underset{[p_{t-2} p_{t-1} p_t s']}{\mathrm{argmin}} E_{BA}(X_t, X_z)$$

The method and the system according to the invention therefore enable effective, automatic and real time fusion to be achieved among the data.

Such a fusion, which draws its ability to integrate the fusion directly from the bundle adjustment was not possible through the methods of the prior art, which do not allow the optimized estimation of a weighting term in real time. It offers accurate and rapid fusion by direct integration of the data within a bundle adjustment method, and in fact offers greater accuracy than the methods using the Extended Kalman filter.

It is not necessary by this technique to estimate the initial covariances of the measurements, nor to propagate the covariances onto the system state, since the method according to the invention automatically adapts itself: estimation in real time of the weighting parameter lambda.

The estimation of the weighting factor is dynamic and real-time. It is calculated for each new optimization, which offers a more complete optimization method with a history of the preceding states, that is to say that we refine the last N poses of the device, contrary to the methods with the Kalman filter according to the prior art.

The invention claimed is:

1. A method for fusing data arising from a first image sensor and from a motion and/or position measuring module, the said first sensor and the said motion and/or position measuring module being integral and forming a device, the method being executed by a processing module in order to localize the said device, comprising:
   a first step consisting of acquiring several points on the images in order to define a current pose $p_t^c$ of the device, including image camera and motion and/or position measuring module, for a given instant t,
   a prediction step of the predicted pose $\hat{p}_t^k$ of the device (camera and motion/position sensor) for the same given instant t and using the measurements from the motion and/or position measuring module,
   a step where we determine an associated constraint $\epsilon_k$ for the sensor k of the device (camera c and sensor k),
   a step where we automatically determine a weighting coefficient $\lambda_t$ of the said constraint,
   an estimation step of the current pose $p_t$ of the said device,
   a step of simultaneous optimization of the poses of the device (camera+sensor) by the bundle adjustment technique using the following cost function:

$$E_{BA}(X_t, Z_t) = \sum_{t'=t-(N-1)}^{t} \epsilon_c^2([p_{t'}s], z_{t'}^c) + \sum_{t'=t-(N-1)}^{t} E_p([p_{t'}s], Z_t)$$

with $$E_p(x_t, Z_t) = \epsilon_c^2(x_t, z_t^c) + \lambda_t^2 \epsilon_k^2(x_t, z_t^k)$$

$\epsilon_c^2$: reprojection errors of the scene in the images
$x_t$: =[ps] the pose of the device and the scene
$z_t^c$: =the observations of the scene detected in the image of the camera c at the instant t
$Z_t = [z_t^c z_t^k]$ combination of all the measurements for all the camera c sensors and of the sensors k of motion and/or position module at an instant t.

2. The method as claimed in claim 1, further comprising a step for initializing the databases of the key poses and of the scene elements (3D) by reconstructing the environment of the image sensor using a given number of first poses and executing a triangulation of the 3D primitives from the elements of interest that constitute them for the chosen poses.

3. The method as claimed in claim 1, wherein the step of automatic selection of the weighting coefficient uses the result of a refinement step of the pose of the device, starting from a first estimation of the pose of the device delivered by the module for estimating the pose by vision [204,304] and taking account of the previously estimated scene elements and [209], by adding to the cost term the prediction error (constraint) delivered by the automatic selection module of the weighting [208] and weighted by a factor lambda $\lambda$ or $\lambda_t$ learned in the automatic selection module of weighting [208, 308];
   at the end of the refinement step, the current pose of the system is added to the database of the poses [212].

4. The method as claimed in claim 1, wherein the step of automatic selection of weighting comprises a refinement step [309] of the pose of the device; in the module [309], the cost function is composed only of the reprojection errors of the 3D primitives of the scene on the camera, whose pose is currently refined, followed by a construction step of the constraint, then by the step of automatic selection of weighting;
   at the end of the refinement step, the current pose of the system is added to the database (historical) of the poses [312].

5. The method as claimed in claim 1, further comprising a step of selection of the key images including the following steps: select a first image I1 as a key image, then a second image I2 chosen as distant as possible from I1 in the video and possessing at least M points of correspondence of interest with I1, then select a third image I3, the most distant from I2 such that there are at least M points of interest correspondent between I3 and I2 and at least M' points of interest correspondent between I3 and I1, and so on for the following images In; proceed in the same way, verifying that the images In−2, In−1 and In possess at least M points of interest corresponding to the same 3D primitive.

6. The method as claimed in claim 1, wherein the constraint is chosen from the following list of constraints:
   Position constraint $$\epsilon_k^t(x_t, z_t^k) = \frac{1}{\sqrt{3}} \|\hat{T}_t^k - T_t\|$$

Orientation constraint:

$$\epsilon_t^R(x_t, z_t^k) = \frac{1}{\sqrt{9}} \|\hat{R}_t^k R_t^T - I_3\|$$

with R as the rotation matrix parametrizing the orientation, I the Identity matrix, Scale factor constraint (or that of the translational standard)

$$\epsilon_k^t(x_t, z_t^k) = \left\|\|\hat{T}_t^k - T_{t-1}\| - \|T_t - T_{t-1}\|\right\|.$$

7. The method as claimed in claim 1, wherein in order to predict the pose $p_t^k$ of the device it uses the inverse observation model $H_{t'}^{-1}$, which provides an estimation of the state $x_{t'}^k$, of the device at an instant t'≤t corresponding to the last measurement $z_{t'}^k$ of the sensor k:

$$\hat{p}_t^k = F_t(H_{t'}^{-1}(z_t^k - n_t^k)) + w_t$$

this model estimates a pose $\hat{p}_t^k$ of the device at the instant t corresponding to the image time $I_t$, from the measurement $z_t^k$ obtained by the motion/position sensor and from the preceding state $x_{t-1}$.

8. A system for fusing data arising from a first image sensor and from a motion and/or position measuring module, said first sensor and said motion and/or position measuring module being integral and forming a device, said system including: a processing unit suitable for executing the steps of the method as claimed in claim 1.

* * * * *

UNITED STATES PATENT AND TRADEMARK OFFICE
CERTIFICATE OF CORRECTION

PATENT NO.      : 9,071,829 B2  
APPLICATION NO. : 13/698267  
DATED           : June 30, 2015  
INVENTOR(S)     : Michot et al.

Page 1 of 1

It is certified that error appears in the above-identified patent and that said Letters Patent is hereby corrected as shown below:

In the claims:

Column 1 line 41-43 claim 6, delete " $\varepsilon_l^R(x_l, z_l^k) = \frac{1}{\sqrt{9}} \| \hat{R}_l^k R_l^T - I_3 \|$ " and insert -- $\varepsilon_k^R(x_l, z_l^k) = \frac{1}{\sqrt{9}} \| \hat{R}_l^k R_l^T - I_3 \|$ --.

Signed and Sealed this  
Twenty-seventh Day of October, 2015

Michelle K. Lee  
*Director of the United States Patent and Trademark Office*